US006565904B2

(12) United States Patent
Roth

(10) Patent No.: US 6,565,904 B2
(45) Date of Patent: *May 20, 2003

(54) METHOD AND APPARATUS FOR PHYSICALLY MANIPULATING MATERIALS TO REDUCE MICROBE CONTENT

(75) Inventor: Eldon Roth, Dakota Dunes, SD (US)

(73) Assignee: Freezing Machines, Inc., Dakota Dunes, SD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/387,979

(22) Filed: Sep. 1, 1999

(65) Prior Publication Data

US 2002/0017203 A1 Feb. 14, 2002

Related U.S. Application Data

(63) Continuation-in-part of application No. 09/144,928, filed on Sep. 1, 1998, now Pat. No. 6,054,164, and a continuation-in-part of application No. 09/213,190, filed on Dec. 17, 1998, now Pat. No. 6,389,838.

(51) Int. Cl.⁷ .............................. A23B 4/08; A23L 1/31; A23L 3/36
(52) U.S. Cl. ....................... 426/319; 426/327; 426/513; 426/518; 426/519; 426/524; 426/641; 426/646
(58) Field of Search .................. 426/524, 319, 426/327, 513, 518, 519, 641, 646; 62/32, 62, 341

(56) References Cited

U.S. PATENT DOCUMENTS

| | | |
|---|---|---|
| 3,023,109 A | 2/1962 | Hines |
| 3,119,696 A | 1/1964 | Williams |
| 3,122,748 A | 2/1964 | Beebe, Jr. |
| 3,728,136 A | 4/1973 | Langlands |
| 4,036,997 A | 7/1977 | VerBurg |
| 4,072,763 A | 2/1978 | Mart |
| 4,192,899 A | 3/1980 | Roth |
| 4,258,068 A | 3/1981 | Huffman |
| 4,474,823 A | 10/1984 | Nishikawa et al. |
| 4,594,253 A | 6/1986 | Fradin ........................ 426/393 |
| 4,919,955 A | 4/1990 | Mitchell |
| 5,082,679 A | 1/1992 | Chapman .................... 426/312 |
| 5,316,745 A | 5/1994 | Ting et al. |
| 5,507,382 A | 4/1996 | Hartwell et al. ............ 198/837 |
| 5,631,035 A | 5/1997 | Clarke et al. |
| 5,690,989 A | 11/1997 | Clarke et al. |
| 6,054,164 A | * 4/2000 | Roth .......................... 426/524 |

FOREIGN PATENT DOCUMENTS

| | | |
|---|---|---|
| GB | 1223159 | 2/1971 |
| JP | 64-39965 | 2/1989 |
| SU | 208118615 | 9/1976 |
| WO | 9317562 | 9/1993 |

OTHER PUBLICATIONS

DIALOG Ascension No. 00211466; Registry No. 81–11–r0743, Waller, P.F., "Spoilage and Spoilage Indicators in Shark Held in Ice." *South Australia Fishermen's Co–operative, Ltd.*, Food Technology in Australia. 1980, 32 (3) 161–164, 166. (Abstract for Journal Article)

DIALOG Ascension No. 00223193; Registry No. 82–07–m0773. Montgomery, R.R., Nofsinger, G.W., Bothast, R.J. Preservation of High–Moisture.

Maize–A Comparison of Gaseous and Liquid Anhydrous Ammonia to Methylene–bis–propionate. *Bulletin of Grain Technology*, 1979, 17 (3) 171–178. (Abstract for Journal Article).

DIALOG Ascension No. 00321821; Registry No. 86–08–h0028, Means, E.G., III, Tanaka, T.S., Otsuka, D.J., McGuire, M.J. "Effects of Chlorine and Amonia Application Points on Bacterial Efficiency." *Journal American Water Works Association*, 1986, 78 (1) 62–69, 14. (Abstract for Journal Article).

Eckhoff, S.R., J.F. Tuite, G.H. Forster, A.W. Kirleis, and M.R. Okos, "Microbial Growth Inhibition by SO2 or SO2 plus NH3 Treatments During Slow Drying of Corn." *Cereal Chemistry*. 1983, 60 (3) 185–188.

Haian Fu and Robert H. Burris. "Ammonium Inhibition of Nitrogenase Activity in Herbaspirillum Seropidacae." *Journal of Bacteriology*, Jun. 1989, pp. 3168–3175.

Anand, C.P. and T.M. Rudra Setty. "Studies on Chemical Control of Psychrophilac Bacterial Spoilage of Fish. iv–The Effect of Chemical Preservatives on the Growth of Psychrophilic Bacteria Isolated from Marine Fish." *Fishery Technology* 1981, 18 (1) 55–57.

Goodfellow, S.J., F.M. Bordeaux, B.A. Masters, W.L. Brown, and M.R. Johnston. "How to Cope with Product Exposure to Ammonia." Oct. 1978, pp. 32–33.

Jay, J.M. 1986, "Sources, Types, Incidence, and Behavior of Micro–organisms in Food" *Modern Food Microbiology*. 3rd E. Ch. 3 pp. 52–56, Ch. 4, pp. 71–72.

\* cited by examiner

*Primary Examiner*—Arthur L. Corbin
(74) *Attorney, Agent, or Firm*—Russell D. Culbertson; Shaffer & Culbertson, L.L.P.

(57) ABSTRACT

A manipulating apparatus (10) receives a plurality of previously frozen pieces of foodstuffs or workpieces (23) and physically manipulates or stresses the workpieces while they remain at least partially in a frozen state. The physical manipulation causes relative movement between various points within the volume of the workpieces (23) and kills microbes within the foodstuff. The treatment process may include physically manipulating the foodstuff in multiple cycles to enhance microbe kill.

23 Claims, 6 Drawing Sheets

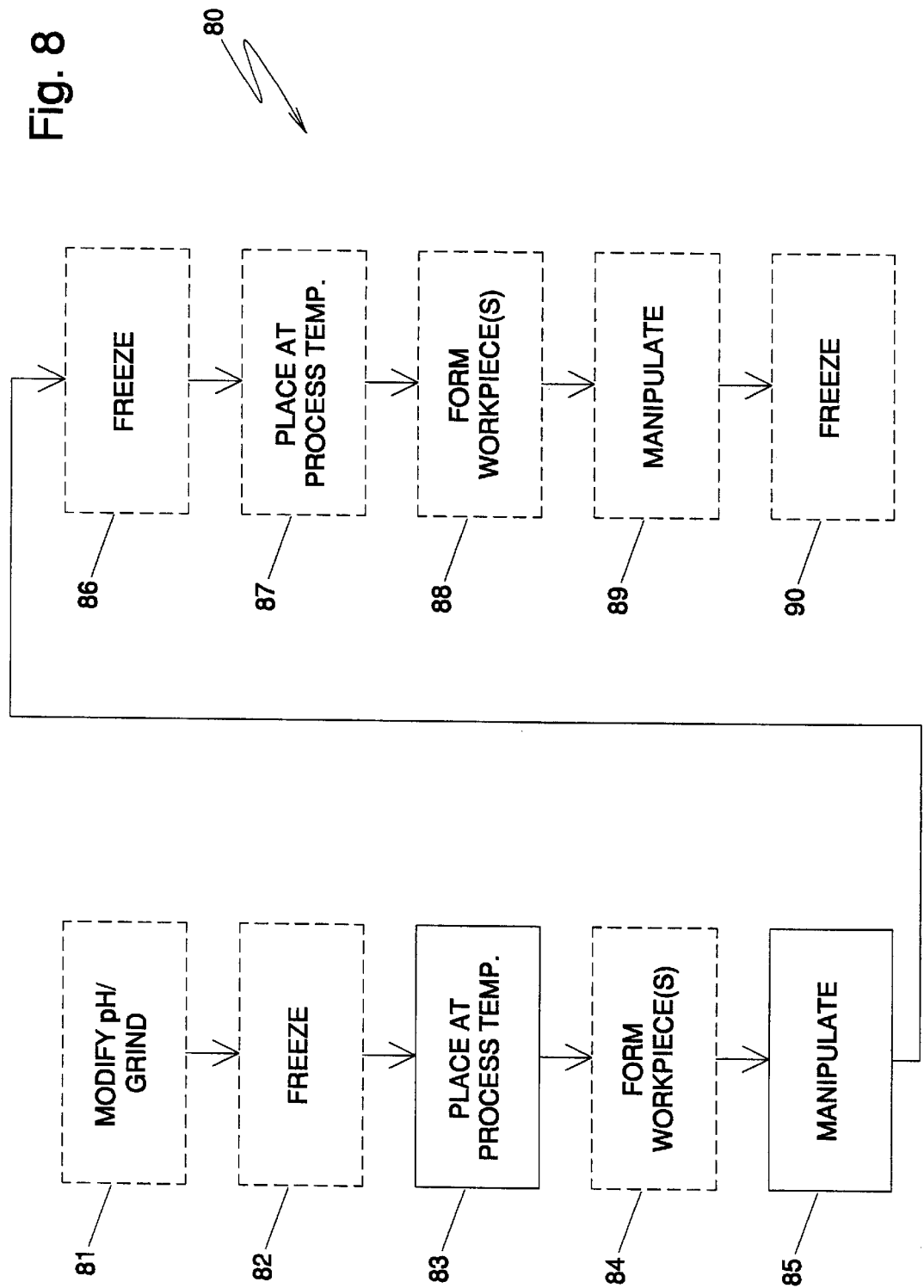

METHOD AND APPARATUS FOR PHYSICALLY MANIPULATING MATERIALS TO REDUCE MICROBE CONTENT

CROSS-REFERENCE TO RELATED APPLICATIONS

This application is a continuation-in-part of pending U.S. patent application Ser. No. 09/144,928, filed Sep. 1, 1998, now U.S. Pat. No. 6,054,164, and of pending U.S. patent application Ser. No. 09/213,190, filed Dec. 17, 1998, now U.S. Pat. No. 6,389,838. The disclosure of each of these related applications is incorporated herein by this reference.

TECHNICAL FIELD OF THE INVENTION

This invention relates to food processing, and more particularly, to reducing microbe content in processed foodstuffs. The invention encompasses both an apparatus and a method for physically manipulating organic materials such as foodstuffs to reduce microbe content.

BACKGROUND OF THE INVENTION

Foodstuffs are inevitably exposed to microbes in the course of processing or in the course of handling prior to processing. Microbes are part of the natural decay process of organic material and may be deposited on foodstuffs through the air or by contact between the foodstuff and contaminated equipment or other material. Although some microbes may be relatively benign, others contribute to spoilage and some can cause serious illness. Lactic acid producing bacteria are examples of benign microbes, while some strains of *E. Coli*, Salmonella, Listeria, and Staph bacteria are examples of pathogenic microbes which can cause serious illness when ingested by humans.

Even with careful processing practices, foodstuffs may be exposed to pathogenic microbes during processing or initial handling. Consumers may become ill by ingesting a foodstuff contaminated with pathogenic microbes. However, the risk of illness from dangerous microbes which may be present in foodstuffs is reduced by careful handling and cooking by the consumer. In larger cuts of meat for example, dangerous microbes may only be present on the surface of the meat and are readily killed in the cooking process.

Ground or chopped and mixed foodstuffs, including ground beef, may carry dangerous microbes which are killed only after thoroughly cooking the material. The reason for this is that dangerous microbes residing at the surface of a larger piece of the foodstuff may be distributed throughout the final ground or chopped product as the large piece is ground and mixed together with other pieces. Thorough cooking is required in order to kill microbes residing in the center of a piece of ground and mixed foodstuff.

It is generally desirable to control the growth of microbes and reduce microbe content in foodstuffs. Microbe content and growth in foodstuffs may be reduced by applying chemical additives or preservatives to the foodstuff. These chemical additives or preservatives, however, may not be acceptable to consumers, or may adversely affect the quality of the foodstuffs.

Alternatively to chemical additives or preservatives, heat may be used to kill microbes in foodstuffs. However, heat processing or sterilization often adversely affects the quality or characteristics of the foodstuff and may make the food product undesirable to the consumer.

SUMMARY OF THE INVENTION

It is an object of the invention to provide a method for reducing microbe content in foodstuffs and to provide an apparatus for performing the method.

The method of the invention comprises physically manipulating or applying stress to the foodstuff while the foodstuff is in a frozen state. While the mechanism by which the process reduces live microbe count is not fully understood, physical manipulation according to the invention has been shown to significantly reduce microbe content in the treated foodstuffs.

The process according to the invention may be performed as a continuous process or as a batch process. In either case, the foodstuff is cooled by a suitable freezing arrangement to a process temperature no greater than the freezing point of the foodstuff to place the foodstuff in a frozen state. As used in this disclosure and the accompanying claims, the "freezing point of the foodstuff" means the temperature at which ice crystals begin to form in the foodstuff at a given pressure. In this "frozen" state according to the invention, liquid material may still be present in the foodstuff along with the ice crystals which have formed. For process temperatures well below the freezing point of the foodstuff, very little or substantially no liquid material may be present in the foodstuff.

Once the foodstuff is frozen, a suitable manipulating arrangement is used to manipulate the frozen material while the material is in a temperature range comprising temperatures not greater than the freezing point of the foodstuff. This physical manipulation according to the invention produces relative movement in the foodstuff. In this sense, "relative movement" means movement between one point in the foodstuff and adjacent points in the foodstuff. It is believed that this relative movement, which preferably occurs throughout the volume of the frozen foodstuff, damages microbes which may be present in the foodstuff and effectively kills much of the live microbes. The invention encompasses manipulating the foodstuff two or more times at substantially the same process temperature or at different temperatures. For example, the foodstuff may be placed at the desired process temperature either from a higher temperature or after being frozen at a lower temperature, and then manipulated once using a suitable manipulating device. After this initial manipulation, the foodstuff may be manipulated again either at the same process temperature or at another process temperature and either with the same type of manipulating device or another type of device. Also, the manipulation steps may be widely spaced apart in time. For example, a comminuted meat product may be manipulated according to the invention one or more times in the production of the product, and may be manipulated again after shipment to another processor or user of the comminuted meat product.

Numerous manipulating arrangements may be employed within the scope of the invention as set out in the following claims. Generally, manipulating arrangements may be classified as (1) compression-type devices, (2) cutting-type devices, or (3) working-type devices. Compression-type manipulating devices include devices which compress the frozen foodstuffs into a block of material, screw-type compressors which compress the frozen foodstuffs as the material is conveyed along a conduit by an auger or screw mechanism, and rolling devices which compress the frozen material as it moves relative to one or more rollers. Cutting-type manipulating devices include grinders, choppers, and slicing devices. Working-type manipulating devices include arrangements which impact the frozen foodstuff and arrangements which bend, stretch, or otherwise work the frozen foodstuff. In each manipulating device, the device may define a working area within which frozen foodstuff is manipulated. As used in the following claims, and unless otherwise specified, a manipulating apparatus or device encompasses any of the types of manipulating devices described in this disclosure. Similarly, a manipulating step may be performed by any of the manipulating devices disclosed herein unless a particular manipulation arrangement is specified.

Regardless of the particular manipulating arrangement employed to manipulate the frozen foodstuffs according to the invention, a manipulator temperature control system associated with the manipulating arrangement preferably controls the temperature of the manipulating arrangement surfaces which come in contact with the frozen foodstuffs. The manipulator temperature control system may cool the surfaces of the manipulating arrangement to ensure that heat from the surfaces of the manipulating arrangement does not raise the temperature of the foodstuffs to a temperature above the desired process temperature. Alternatively, the manipulator temperature control system may heat the manipulating arrangement surfaces and thereby heat the frozen foodstuffs from a lower process temperature to the freezing temperature or even slightly above the freezing temperature. Also, maintaining the surfaces of the manipulating arrangement at a temperature near the process temperature or slightly above the process temperature helps prevent the foodstuffs from sticking to the manipulator surfaces.

One preferred implementation of the invention utilizes a pressure change in a frozen foodstuff to place the foodstuff in a fully or partially unfrozen state. The pressure may be applied as part of a manipulation of the foodstuff or as a separate step. In this aspect of the invention, the foodstuff at a process temperature is compressed by a suitable arrangement to place at least a portion of the foodstuff in a condition in which that portion of the material is not in a frozen state. When the pressure is released, the foodstuff once again goes to a frozen state with ice crystals forming very rapidly.

Physical manipulation according to the invention may be accompanied by manipulating the foodstuff pH before a physical manipulation or both before and after a physical manipulation. The pH of the foodstuff may be modified in any suitable manner. For example, a higher pH foodstuff such as lean finely textured beef may be mixed with a regular ground beef to modify the pH of the resulting mixture. The process of producing lean finely textured beef, which increases pH with respect to the starting material, also represents a suitable pH modifying step. Also, a foodstuff may be placed in contact with $NH_3$ (Ammonia) in gaseous or aqueous form to increase the pH of the foodstuff. U.S. patent application Ser. No. 08/803,322, now U.S. Pat. No. 5,871,795, the disclosure of which is hereby incorporated herein by this reference, discloses a pH modifying apparatus and method which may be employed in this invention. pH modification within the scope of the invention also encompasses decreasing pH. The pH of a foodstuff may be decreased by placing the foodstuff in contact with a pH reducing material such as $CO_2$, for example.

The present invention is applicable to many types of foodstuffs. For example, comminuted foodstuffs such as ground meats are ideally suited for the present process. The invention may also be applied to larger cuts of meat or cubed or sliced meats. Furthermore, the invention is applicable to vegetable and fruit material including juices. For purposes of this disclosure and the accompanying claims, "foodstuff" may include substantially any food material or mixture of materials which can be held in a workable or manipulatable form at a process temperature. Also, the treatment process is applicable to other materials which contain water and are capable of supporting microbe growth. These other materials are to be considered equivalent to foodstuffs for the purposes of the following claims.

Commonly, the treatment process according to the invention includes forming the material to be treated into a workpiece or a plurality of workpieces either before or after being placed at a process temperature. The workpiece or workpieces may then be physically manipulated by the suitable manipulating device.

These and other objects, advantages, and features of the invention will be apparent from the following description of the preferred embodiments, considered along with the accompanying drawings.

BRIEF DESCRIPTION OF THE DRAWINGS

FIG. 8 is a block diagram showing a multiple-cycle treatment process embodying the principles of the invention.

DESCRIPTION OF THE PREFERRED EMBODIMENTS

Figure 1:
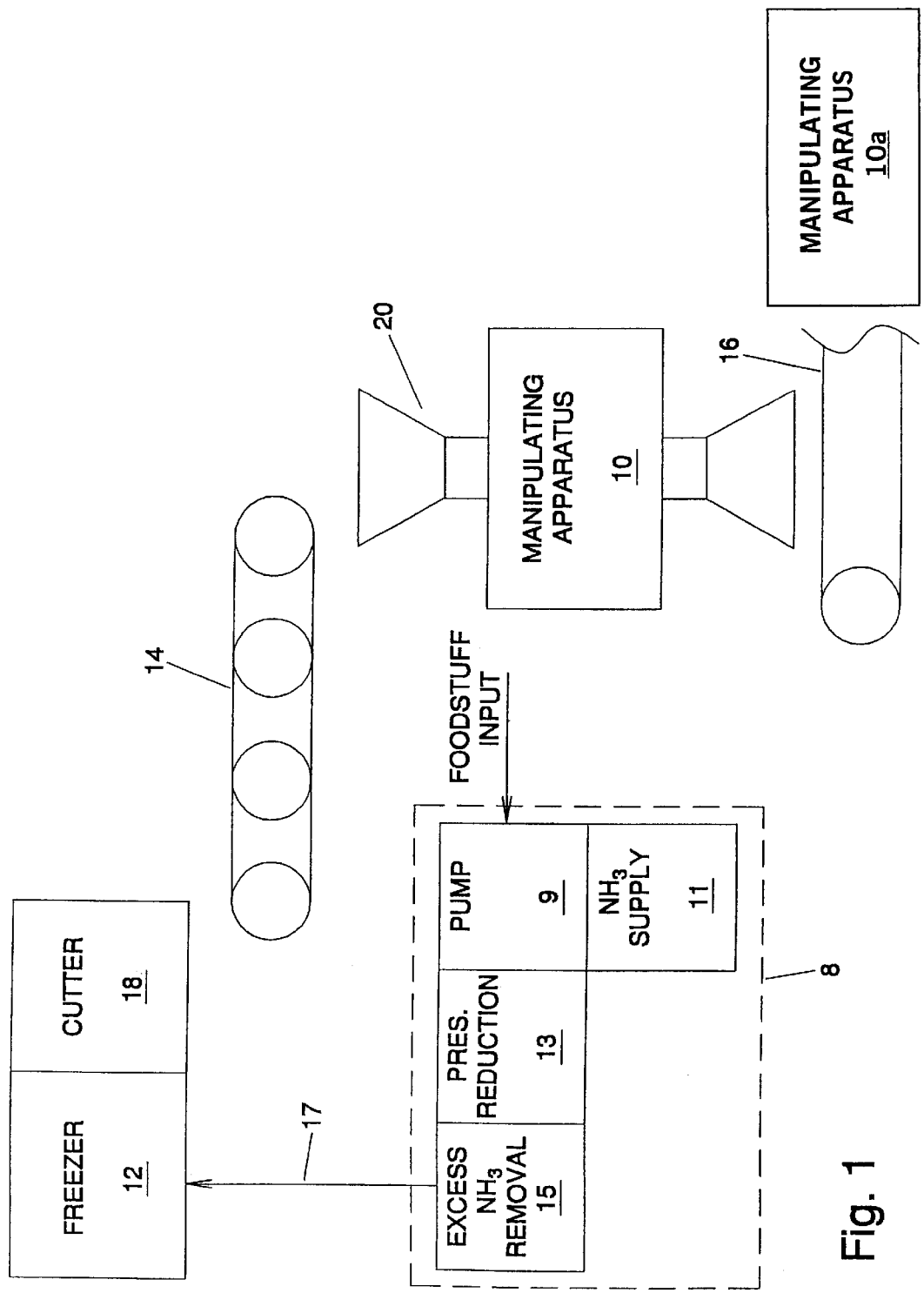
FIG. 1 is a diagrammatic representation of a foodstuff pH and physical manipulation system embodying the principles of the invention.

Referring to FIG. 1, an apparatus 10 for manipulating foodstuffs is associated with a pH manipulating system 8 and a suitable freezer 12. A transport device 14 is positioned between freezer 12 and manipulating apparatus 10. A second to transport device 16 may be positioned at an outlet from the manipulating apparatus 10 for transporting treated foodstuffs to further processing equipment. An additional manipulating apparatus 10a is shown in FIG. 1 for providing an additional manipulation as will be discussed further below with reference to FIG. 8.

The illustrated pH manipulating system 8 includes a pump 9, $NH_3$ supply 11, pressure reduction arrangement 13, and a system 15 for removing excess $NH_3$. Conduit 17 transfers pH modified foodstuff to freezer 12. Pump 9 preferably comprises a piston pump with an injection arrangement (not shown) for injecting a measured amount of $NH_3$ from supply 11 into the foodstuff stream either during compression or prior to compression. The pump preferably compresses the $NH_3$ and foodstuff to a pressure at or above the vapor pressure of the $NH_3$ at the temperature of the foodstuff. As disclosed in U.S. patent application Ser. No. 08/803,322, now U.S. Pat. No. 5,871,795, this treatment pressure has been found to rapidly increase the pH of foodstuffs. Pressure reduction arrangement 13 may comprise any suitable device or arrangement for releasing the pressure developed by pump 9. Device 15 may comprise an arrangement for applying a vacuum or any other arrangement for drawing off excess $NH_3$ after the treatment pressure is released at device 13.

Those skilled in the art will appreciate that many arrangements other than the system 8 shown in FIG. 1 may be used to modify the pH of the foodstuff. For example, the foodstuff may be treated in batches in a vessel into which a suitable pH modifying gas is introduced. Also, a liquid material such as aqueous $NH_3$ may be applied to the foodstuff under pressure or otherwise. Furthermore, an apparatus such as that described in U.S. patent application Ser. No. 09/286,699, now U.S. Pat. No. 6,142,067, entitled "APPARATUS AND METHOD FOR TREATING AMMONIATED MEATS," the disclosure of which is incorporated by this reference, may be used to ensure a consistent pH change throughout the foodstuff to be treated. Any pH modifying material may be used to modify the pH of the foodstuff within the scope of the invention.

Where a pH modification is used along with physical manipulation, the pH change preferably comprises increasing the pH of the foodstuff. However, pH modification within the scope of the invention also encompasses decreasing the pH of the foodstuff. Decreasing the pH may be accomplished by applying a pH decreasing material such as $CO_2$ gas to the foodstuff preferably under pressure as described above with reference to FIG. 1. Furthermore, no pH modifying material may be needed for processing certain foodstuffs. For example, reducing the fat content of a comminuted beef product may change the pH of the material sufficiently within the scope of the invention, as may mixing a reduced fat product with a regular comminuted product.

As will be discussed in further detail below with reference to FIG. 8, the pH manipulation step is not mandatory in order to produce the desired microbe kill. Although a pH change prior to physical manipulation may enhance microbe kill in some cases, significant microbe kill is produced by the physical manipulation step (or steps) alone.

In the form of the invention shown in FIG. 1, freezer 12 freezes the pH modified foodstuff, and cutter 18 cuts the frozen foodstuff into workpieces which are then placed on transport device 14. Transport device 14 transports the workpieces to manipulating apparatus 10. Manipulating apparatus 10 physically manipulates the frozen foodstuff to produce relative movement between different points in the volume of the foodstuff. This relative movement occurs preferably throughout the entire volume of the foodstuff during the treatment process. It is believed that the relative movement caused by manipulating apparatus 10 damages the cell walls of microbes in the foodstuff, thereby killing the microbes. This damage to the microbes may be accomplished as ice crystals are pressed against the microbe cell walls in the course of the manipulation. The microbes may also become brittle at the processing temperature employed by the invention and the manipulation may serve to damage the cell walls in this relatively brittle state. Although the mechanism by which microbe kill is accomplished is not fully understood, tests of the apparatus and process according to the invention indicate significant microbe kill.

Freezer 12 may be any suitable device capable of cooling the foodstuff to a process temperature no greater than the freezing point of the foodstuff (that is, a temperature less than or equal to the freezing point of the foodstuff). For example, freezer 12 may comprise a roller-type freezer such as the type disclosed in U.S. Pat. Nos. 4,138,768 and 4,192,899, which are incorporated herein by this reference. Regardless of the particular type of freezer employed, freezer 12 preferably freezes the foodstuff in less than thirty (30) minutes and optimally in less than about ten (10) minutes. The roller-type freezer disclosed in U.S. Pat. Nos. 4,138,768 and 4,192,899 is particularly well-suited for rapidly freezing foodstuffs into thin sheets of material which may then be cut into small sections. Freezing times of approximately 2 minutes may be obtained using these roller-type freezers. Regardless of the freezer type, a rapid first freeze is preferable for purposes of the present invention because rapid freezing produces relatively smaller ice crystals as compared to a slow freezing process. It is believed that the smaller ice crystals improve microbe kill during the manipulation or stressing step according to the invention.

Freezer 12 also preferably has associated with it a forming arrangement for forming the foodstuff into workpieces comprising discrete pieces of foodstuff. The forming arrangement may comprise the cutting system 18 such as the cutting system shown in U.S. Pat. No. 4,192,899. This cutting arrangement 18 cuts workpieces from the sheet of frozen foodstuff produced by freezer 12. Alternatively, the foodstuff may be formed into workpieces in an unfrozen state and then frozen to the process temperature. In any event, the workpieces preferably comprise approximately half-inch by half-inch squares having a thickness of approximately 0.25 to 0.125 inches. Although larger workpieces may be used within the scope of the invention, the thickness of workpieces is preferably less than 0.75 inches. The thinness of the workpiece helps ensure relative movement throughout the volume of the workpiece as it is manipulated according to the invention. Also, thin sheets or workpieces of foodstuff may be cooled more quickly to the process temperature.

Transport device 14 preferably comprises a vibrating conveyor capable of receiving the frozen workpieces from freezer 12 and cutter system 18, and transporting the workpieces to an inlet 20 associated with manipulating apparatus 10. Details of the transport device 14 are not shown in the figures since a number of different types of conveying devices may be employed within the scope of invention, and in any event the details of such conveying devices are well within the knowledge of those skilled in the present field. Transport device 14 preferably moves the frozen workpieces quickly to the manipulating device 10 so that the workpieces are manipulated as quickly as possible after being frozen to the process temperature. It is believed that microbes which have been maintained at the process temperature for a long period of time can better survive the physical manipulation. In the preferred form of the invention, manipulating device 10, freezer 12, and transport device 14 are situated and operated such that the workpieces are manipulated according to the invention as quickly as possible after reaching the process temperature, and preferably no more than about ten (10) minutes, about thirty (30) minutes, about one hour, or as much as 24 hours, after the workpieces reach the process temperature, although longer periods may be used within the scope of the invention.

Figure 2:
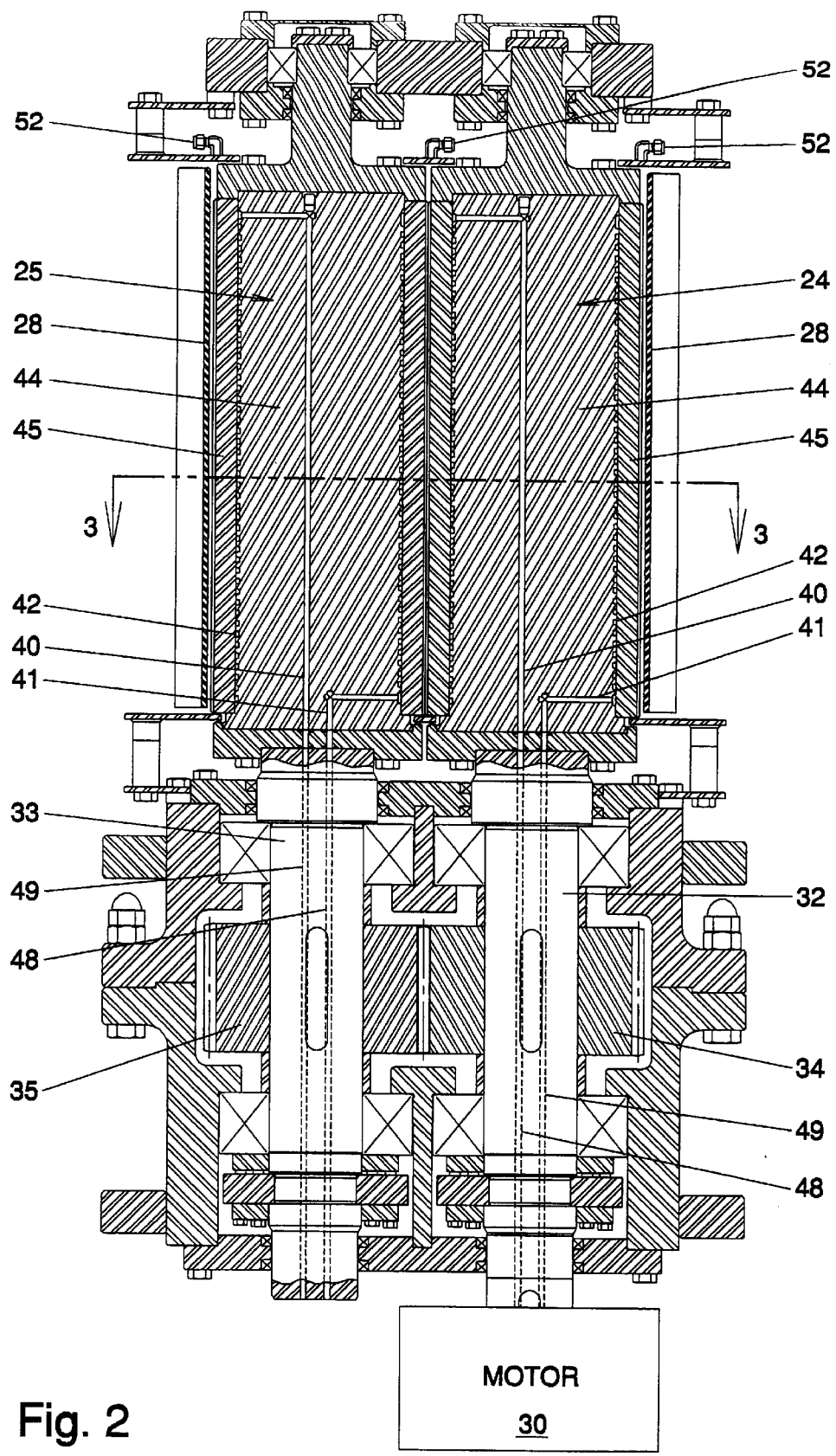
FIG. 2 is a partial longitudinal section view of a manipulating arrangement shown diagrammatically in FIG. 1.
Figure 3:
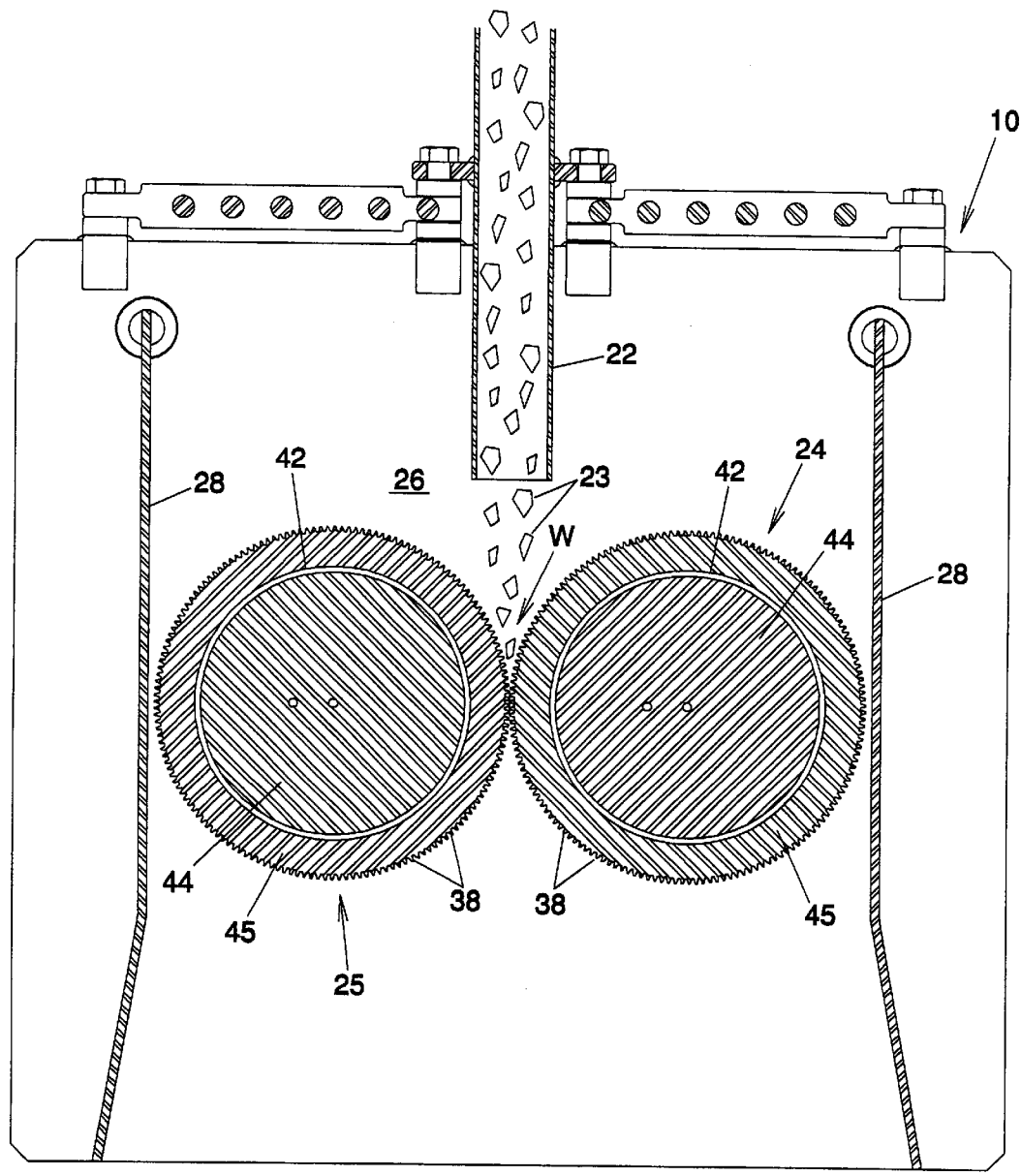
FIG. 3 is a partial transverse section view taken along line 3—3 in FIG. 2.

One preferred manipulating apparatus 10 is shown in FIGS. 2 and 3. Manipulating apparatus 10 includes a chute 22 through which workpieces 23 drop from the transport device 14 shown in FIG. 1. The illustrated manipulating apparatus 10 comprises a compression-type device which compresses the foodstuff between two spaced apart rollers 24 and 25 within a chamber 26. Rollers 24 and 25 are positioned within chamber 26 with their longitudinal axes extending substantially parallel to each other. Chamber walls 28 are positioned on either side of the two rollers. Rollers 24 and 25 are spaced apart with a minimum clearance between the roller surfaces which is less than an initial thickness of the workpieces 23. For example, workpieces 23 may be approximately 0.25 to 0.125 inches thick and the clearance between the opposing surfaces of rollers 24 and 25 may be approximately 0.10 inches. The spaced apart rollers 24 and 25 define a working area W extending from the point of minimum clearance between the roller surfaces upwardly to a point at which workpieces 23 first make contact with both rollers.

At least one of the rollers 24 or 25 is driven by a suitable drive motor so as to rotate about its longitudinal axis. The direction of rotation is toward the opposing roller. In the illustrated form of the invention, both rollers 24 and 25 are driven by a single drive motor 30 in a counter rotating fashion toward each other. Drive motor 30 drives first roller 24 directly through shaft 32 and timing gears 34 and 35 cooperate to drive the second roller 25. Timing gear 34 is mounted on drive shaft 32 while timing gear 35 is mounted on drive shaft 33 which is rigidly connected to second roller 25. Although not shown in the drawings, those skilled in the art will appreciate that drive motor 30 includes a suitable transmission arrangement for transmitting power to the first drive shaft 32. The drive motor 30 and associated transmission arrangement may be adapted for driving rollers 24 and 25 at a constant speed, or may be adapted to vary the speed to suit different processing rates.

Although rollers 24 and 25 may have a substantially smooth outer surface, the illustrated preferred rollers include longitudinally extending ridges 38. Rollers 24 and 25 are rotated in synchronization through the timing gears 34 and 35 so that each ridge 38 on one roller registers between adjacent ridges on the opposing roller similarly to the cogs of two intermeshed gears. However, the ridges 38 on the opposing rollers preferably do not touch, but always maintain a minimum clearance between the opposing roller surfaces, for example approximately 0.10 inches.

The manipulating apparatus 10 shown in FIGS. 2 and 3 also preferably includes a manipulator temperature control system for cooling or warming the outer surfaces of rollers 24 and 25, that is, the surfaces of the manipulating apparatus which may come in contact with workpieces 23. Maintaining the outer surface of rollers 24 and 25 at a temperature near the process temperature prevents the rollers from heating workpieces 23 above the process temperature as the workpieces come in contact with the roller surfaces. A roller outer surface temperature which is near but just above the particular process temperature being employed also helps prevent workpieces 23 from sticking to the rollers 24 and 25 and may also enhance microbe kill as discussed below. For example, the outer surfaces of the rollers 24 and 25 may be maintained at approximately 32 degrees Fahrenheit where the process temperature is approximately 28 degrees Fahrenheit or lower.

The illustrated temperature control system includes for each roller 24 and 25 an inlet 40 and an outlet 41. A channel 42 extends near the outer surface of the respective roller and is preferably formed as a continuous spiral groove between an inner roller member 44 and an outer roller member 45. A temperature controlling fluid is circulated through an inlet duct 48 associated with respective roller drive shaft 32 and 33 into the inlet 40, through the continuous spiral channel 42, and out through outlet port 41 and outlet duct 49 formed in the respective drive shaft. Any suitable fluid may be circulated through the temperature control system for cooling or heating the outer surfaces of rollers 24 and 25 preferably to a temperature near the processing temperature, that is, the temperature of the frozen workpieces as they pass between the rollers. The system for producing the temperature control fluid, directing the fluid into inlet duct 48, and receiving the returning fluid from outlet duct 49 is omitted from the drawings so as not to obscure the invention in unnecessary detail. Such system is within the knowledge of those skilled in the art.

The roller-type manipulating apparatus 10 shown in FIGS. 2 and 3 also preferably includes gas injection ports 52. Any suitable gas such as clean air may be injected through the gas injection ports 52 so as to flow over the outer surfaces of rollers 24 and 25. The injected gas helps clean the roller surfaces and separate foodstuff material which may partially stick to the roller surfaces.

Figure 5:
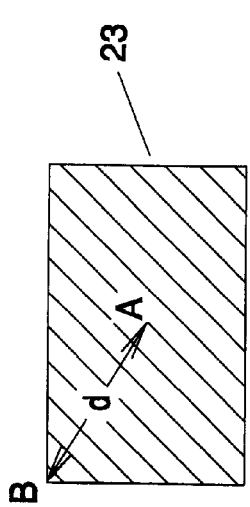
FIG. 5 is a view in section taken along line 5—5 in FIG. 4.
Figure 6:
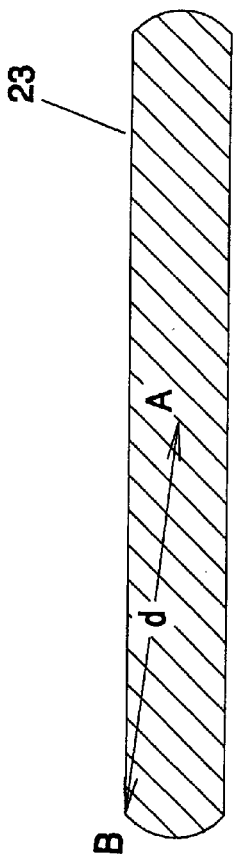
FIG. 6 is a view in section taken along line 6—6 in FIG. 4.
Figure 4:
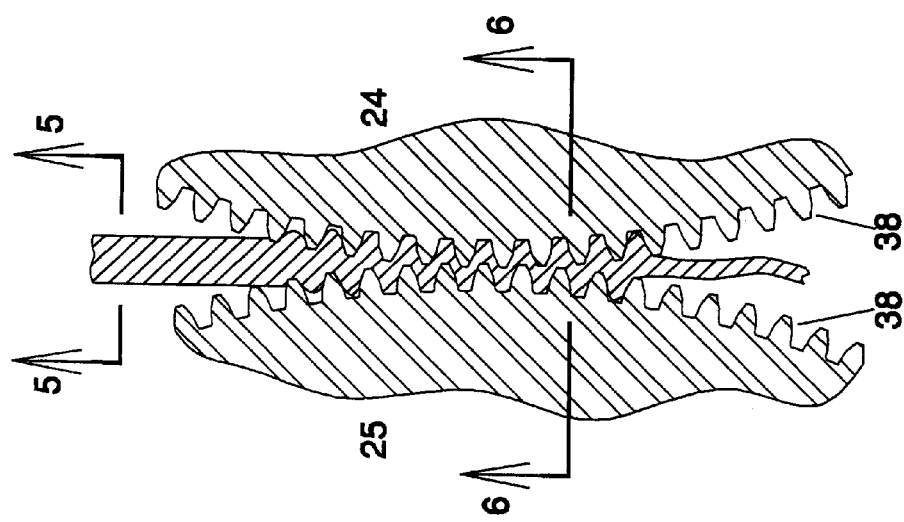
FIG. 4 is an enlarged diagrammatic side view of a piece of foodstuff being drawn between the rollers of a preferred manipulating arrangement.

In operation, the roller-type manipulating apparatus 10 shown in FIGS. 2 and 3 receives a plurality of workpieces 23 into chamber 26 immediately above rollers 24 and 25. As at least one of the rollers is rotated toward the opposite roller or both rollers are rotated toward each other in counter rotating fashion, workpieces 23 are drawn into the working area W and through the area of minimum clearance between the rollers. This action in shown best in FIGS. 4 through 6. Referring to FIGS. 4 and 5 each frozen workpiece retains generally its initial shape before passing into the working area W between rollers 24 and 25. However, as shown in FIG. 6, the workpiece material is forced to spread out laterally as the workpiece passes through the working area W and ultimately through the area of minimum clearance between rollers 24 and 25. This spreading of the workpiece material causes relative movement between points within the volume of the material. For example, referring to FIG. 5, a central point A in workpiece 23 resides a distance d to a point B at one corner of the workpiece. However, as the workpiece 23 spreads out as it passes between rollers 24 and 25 as shown in FIG. 6, the distance d between point A and point B changes significantly. This relative movement would occur even if rollers 24 and 25 each had a smooth outer surface. The ridged rollers 24 and 25 have the added advantage of forcing the workpiece material to bend around the opposing ridges 38. This bending in the workpiece material produces additional relative movement between various points within the material.

In the preferred form of the invention, the manipulating arrangement causes relative movement throughout the volume of the foodstuff being processed. Relative movement throughout the foodstuff ensures consistent microbe kill throughout the foodstuff. However, manipulation which produces relative movement in only a portion of the material being processed produces microbe kill in that portion of the material in which the relative movement occurs. Significant microbe kill can be accomplished according to the invention by manipulating the frozen foodstuff so as to produce relative movement in at least approximately twenty percent of the volume of the foodstuff. In the roller-type manipulating arrangement disclosed in FIGS. 1 through 6, the extent of relative movement in the workpieces is controlled primarily by the clearance between the rollers relative to the initial thickness of the workpieces. A clearance between rollers equal to ninety-five percent (95%) or less of the total initial thickness of the individual workpieces produces the desired compression and relative movement in a significant volume of the foodstuffs being processed.

Figure 7:
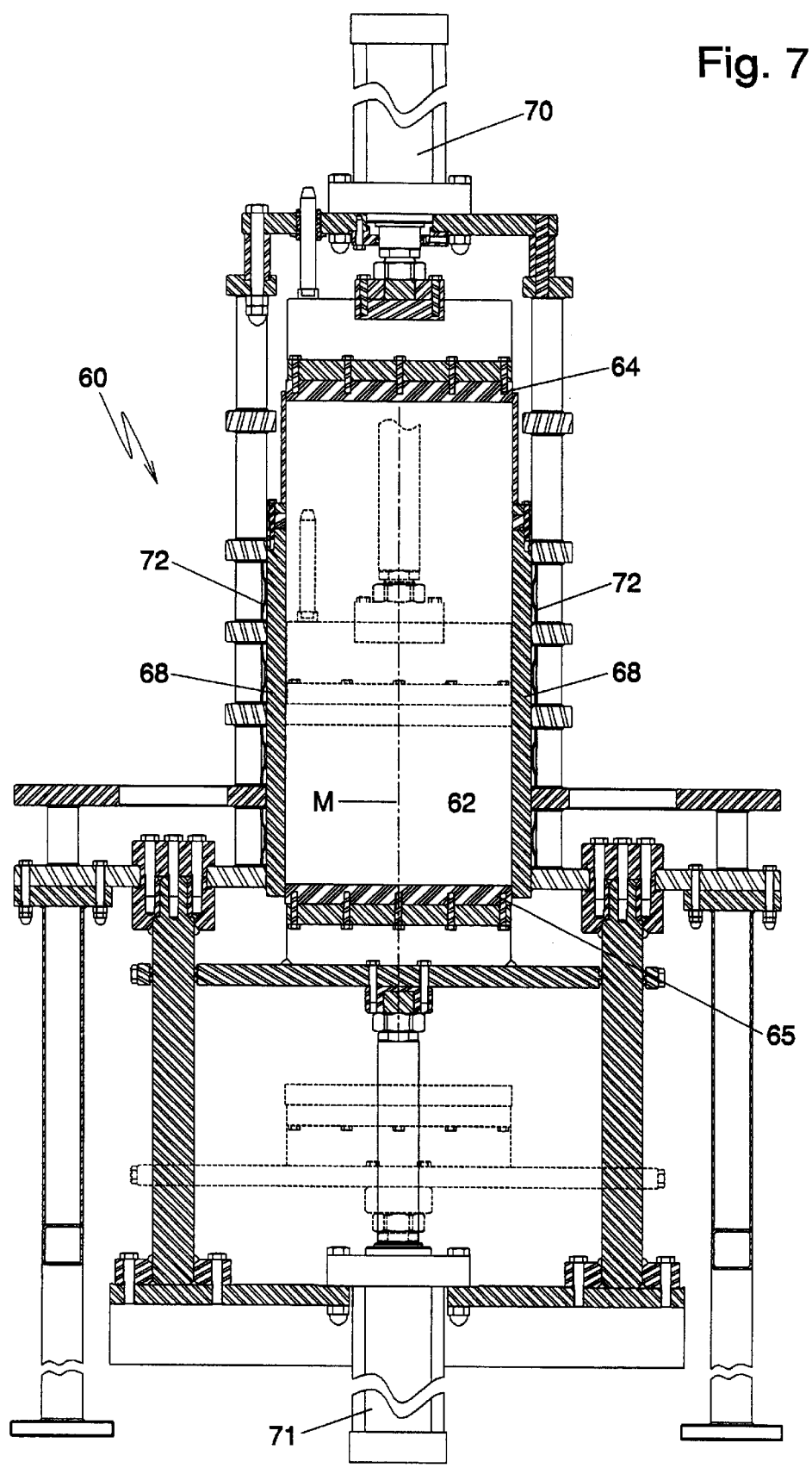
FIG. 7 is a partial section view showing an alternate manipulating arrangement embodying the principles of the invention.

FIG. 7 shows a block forming manipulating device 60 according to the invention. In the form of invention shown in FIG. 7, workpieces (not shown in FIG. 7) are collected in an area 62 bounded by at least one movable plate. The form of invention shown in FIG. 7 has both a movable top plate or platen 64 and a movable bottom plate or platen 65. Both top plate 64 and bottom plate 65 are movable along axis M relative to chamber walls 68. A top actuator 70 is associated with top plate 64 while a bottom actuator 71 is associated with bottom plate 65. Actuator 70 may comprise a suitable hydraulic or pneumatic piston and cylinder unit for positioning the top plate 64 along the axis M. Actuator 71 may similarly comprise a piston and cylinder arrangement for positioning bottom plate 65 along axis M. Chamber walls 68 may each have a structure 72 which allows a temperature control fluid to be circulated there through for cooling or heating the chamber walls to a temperature near the process temperature similarly to the rollers 24 and 25 discussed above with particular reference to FIGS. 2 and 3.

In operation, numerous small workpieces (not shown in FIG. 7) are randomly arranged in the area 62 defined by bottom plate 65 and chamber walls 68. The random arrangement of rigid small workpieces in the area 62 leaves numerous voids between the individual workpieces. Once the area is filled to a desired point, top actuator 70 is operated to move the top plate downwardly toward bottom plate 65 and into the area 62 defined between the chamber walls 68. A lowered position of top plate 64 is shown in phantom in FIG. 7. As top plate 64 advances toward bottom plate 65, the workpieces deform to fill the voids in the volume. This deformation produces relative movement throughout each workpiece.

Top plate 64 may be advanced downwardly until the individual workpieces (not shown in FIG. 7) in area 62 deform to produce substantially a solid block of material. At is point, bottom actuator 71 may be operated to move bottom plate 65 downwardly along axis M as top plate 64 continues downwardly. This downward movement of both top plate 64 and bottom plate 65 pushes the block formed from the frozen workpieces out from between chamber walls 68. Once the block clears chamber walls 68, the block of frozen material may be transferred by suitable means to another location for packaging or further processing.

Manipulating apparatus 60 shown in FIG. 7 is used in connection with a freezer and a transport device which are not shown in the drawing. The freezer may be the same type of freezer discussed with reference to FIG. 1. The transport device may be any suitable conveyor or other device for transporting the frozen, workpieces from the freezer to the chamber area 62. The freezer preferably freezes the workpieces in less than 30 minutes and optimally in less than 10 minutes. Relatively small workpieces are preferable for use in the manipulating arrangement shown in FIG. 7. Workpieces having a size on the order of 0.5 inches by 0.5 inches by 0.25 inches ensure consistent relative movement within each workpiece. However larger or smaller thin pieces of frozen comminuted or ground foodstuffs may be effectively treated with the apparatus 60 shown in FIG. 7.

The block forming manipulating device 60 shown in FIG. 7 and the roller manipulating device 10 shown in FIGS. 2 and 3 are both compression-type manipulating devices. Another compression-type manipulating device may comprise a screw compressor which uses a rotating screw or auger to compress material within a conduit in which the screw or auger is mounted. A screw compressor may force the foodstuff being treated through the openings of a grinder plate or screen and include a cutting arrangement to cut the foodstuff at the grinder plate or screen. Thus, screw compressor manipulating devices may manipulate the foodstuff both by compression and by cutting or grinding. The working area of these screw compressor manipulating devices comprises the area within which the auger rotates.

In addition to screw-type grinders other cutting-type manipulating devices according to the invention include chopping devices such as a bowl chopper which presses a blade repeatedly into a mass of material to chop the material into smaller pieces, and slicing devices which use a blade to slice a relatively thin piece of material from a larger piece.

In cutting-type manipulating devices, both a localized pressure and a localized bending action is applied to the frozen foodstuff as the blade or other cutting element passes through the foodstuff. This localized pressure and physical displacement of the foodstuff produces the desired relative movement within the frozen foodstuff and resultant kill of live microbes in the foodstuff. In the bowl cutter device, workpieces of the frozen foodstuff may be fed to the device by any suitable means. In contrast, the slicing device may operate on relatively large pieces of foodstuff at the process temperature, or even a continuous strand of foodstuff fed continuously to the slicing device. These chopping or slicing type manipulating devices must chop or slice the frozen foodstuff into relatively small pieces in order to provide the desired relative movement in a substantial volume of the foodstuff. For example, 0.5 by 0.5 by 0.25 inch pieces of frozen foodstuff may be chopped in a bowl chopper in order to produce the desired movement. The material may be chopped in the bowl chopper until the temperature of the material rises to a maximum process temperature no greater than the freezing point of the foodstuff. Slicing-type manipulating devices preferably cut the foodstuff into slices no greater than approximately three-eighths inch thick. The working area comprises the area of the slice adjacent to the blade as it passes through the material.

Working-type manipulating devices according to the invention comprise substantially any arrangement for impacting the frozen foodstuff, or bending, stretching or otherwise working the frozen foodstuff. For example, workpieces of frozen foodstuff may be fed to an impeller arrangement which impacts the workpieces to cause localized pressure increases within the foodstuff and relative movement within the foodstuff as the material deforms in response to the impact. Alternatively, a blending device may produce the desired relative movement as a blending element or paddle passes through a mass of frozen workpieces held in a working area. In this latter case, the workpieces are held at a relatively high process temperature. Such a relatively high process temperature leaves a significant liquid in the foodstuff, causing the material to be relatively malleable.

Bending and stretching a foodstuff at a process temperature may be accomplished by passing the foodstuff between opposing conveyor belts arranged to follow a tortuous path. Alternatively, the foodstuff may be passed through a conduit which follows a tortuous path. In either case, as the foodstuff is bent around a radius comprising the working area, the material at the outside of the radius is placed in tension and stretched somewhat while the material at the inside of the radius is placed in compression. Either condition produces the desired relative movement in the frozen foodstuff, provided the foodstuff is maintained at a relatively high process temperature, in a range from 25 to 32 degrees Fahrenheit, for example. These relatively high process temperatures leave the foodstuff fairly malleable and capable of being worked.

FIG. 8 illustrates the process steps in a multiple-cycle manipulation process 80 according to the invention. The figure may also be used to describe a single manipulation cycle process within the scope of the invention. The process blocks shown in dashed lines are optional and present in the figure only for purposes of fully describing the multiple-cycle aspect of the invention. Also, FIG. 8 includes a pH modification step which is optional and not necessary in practicing the physical manipulation process according to the invention.

The first step 81 shown in process 80 is the optional step of modifying the pH of the foodstuff and/or grinding the foodstuff. This first grinding may itself be performed on foodstuff at a process temperature and thus may comprise a first physical manipulation cycle. At optional step 82, the foodstuff is frozen to a relatively low process temperature, preferably quickly using a freezing machine such as a roller-type freezer. It is believed that thoroughly freezing the foodstuff at this point places further strain on live microbes in the foodstuff and ultimately enhances microbe kill.

At step 83 in FIG. 8, the foodstuff is placed at the desired process temperature for physical manipulation. The process temperature is preferably from approximately 20 degrees to not greater than 28 degrees Fahrenheit for this step. Where step 82 has been performed, step 83 comprises tempering the frozen foodstuff to the desired higher process temperature, either by heating the foodstuff or blending the foodstuff with additional material at a higher temperature. However, where the foodstuff has not been frozen at step 82, step 83 comprises reducing the temperature of the foodstuff by suitable means, preferably using a roller-type freezer described above or a spiral freezer.

Depending upon the type of foodstuff being treated and the type of manipulating device being used, optional step 84 may be included in process 80 to form the foodstuff into suitable workpieces. For example, where the manipulating device comprises the roller-type device 10 shown in FIGS. 2 and 3 or a block forming device such as device 60 shown in FIG. 7, the foodstuff may be cut into pieces on the order of 0.5 inches by 0.5 inches by 0.25 inches. Where the manipulating device comprises a slicing device or a roller device, the foodstuff may be formed into a substantially continuous strand which is advanced continuously through the respective manipulating device. Such a strand of foodstuff is to be considered equivalent to individual workpieces for purposes of this disclosure and the following claims.

At step 85 the foodstuff at the desired process temperature, formed into appropriate workpieces or otherwise, is manipulated in a suitable manipulating device. The device may comprise a compression-type device, cutting-type device, working-type device, or a device which effectively combines different types of physical manipulation such as a grinder as described above. In each case the manipulating device produces relative movement or displacement within the volume of the foodstuff.

After manipulation at step 85, the foodstuff may be used (cooked, heated for serving, or incorporated into another food product) immediately, or used after storage in a frozen state. Step 86 comprises freezing the manipulated foodstuff, that is, reducing the temperature of the already partially or fully frozen foodstuff. This freezing step after manipulation preferably comprises reducing the temperature of the manipulated foodstuff slowly over the course of one to three days to a temperature of approximately 5 to 10 degrees Fahrenheit. The frozen foodstuff may then be stored or processed through steps 87, 88, 89, and 90 similar to steps 83, 84, 85, and 86, respectively. Step 89 represents a second (or third depending on step 81) manipulation step. This multiple-cycle freezing and manipulation process may further reduce the live microbe content of the foodstuff.

The manipulating process according to the invention is particularly applicable to comminuted foodstuffs. As used in this disclosure and in the following claims, a comminuted foodstuff may comprise any ground, chopped, or mixed foodstuff which is made up of relatively small pieces of foodstuffs which have been cut down or otherwise formed from larger pieces. The invention is well suited for treating ground meat such as beef, pork, or poultry. In the following examples, the process was applied to comminuted beef products. However, the invention may be used to treat substantially any foodstuff including comminuted foodstuffs, juices, non-comminuted foodstuffs, and other water bearing materials capable of being manipulated in a frozen or partially frozen state.

The manipulation according to the invention provides an immediate reduction in microbe count. However, microbe count decreases further for a period of time after the manipulation is performed. It is therefore preferable to use the processed foodstuffs no sooner than approximately 24 hours after the manipulation is performed and the material slowly frozen to 5 to 10 degrees Fahrenheit. In this sense "use" the foodstuffs means cook or heat the product, or incorporate it into another food product.

Regardless of the particular manipulation arrangement used, it may be desirable to cause at least a portion of each workpiece to go to an unfrozen state during the physical manipulation step. As used in this disclosure and the following claims, an "unfrozen" state means a state in which some, but not necessarily all, ice crystals formed in the foodstuff when the foodstuff was cooled to the process temperature go back to a liquid state. Placing a portion of each workpiece in an unfrozen state may be accomplished by the pressure applied in the manipulation step or may be accomplished by increasing the temperature of a portion of each workpiece during the manipulation step to the freezing point of the foodstuff or slightly above the freezing point. After physically manipulating or stressing the workpieces, each workpiece is re-frozen to a process temperature, that is, a temperature no greater than the freezing point of the foodstuff at the given pressure. The workpieces may be re-frozen by cooling them in a suitable freezing device or by allowing the still frozen portions of the workpieces to re-freeze the adjacent unfrozen portions. Also, re-freezing may be accomplished in some cases simply by removing the pressure applied during the manipulation step. Re-freezing by pressure reduction can be accomplished very quickly and is thus preferred for producing greater stress on live microbes which may be present in the foodstuff.

Example I

A test was performed using a block-type manipulation apparatus similar to that illustrated in FIG. 7. Two batches of foodstuffs were processed in the apparatus. A first batch comprised regular ground beef having a pH of approximately 5.25 to 5.5. A second batch was made up of ground beef mixed with 15% (by weight) lean finely textured beef having a pH of approximately 6.25 to 6.5. The ground beef used in the second batch was taken from the same lot as the ground beef used in the first batch. It will be noted that the pH increase in the second batch was accomplished by mixing the higher pH lean finely texture beef with the lower pH ground beef.

The first batch comprising regular ground beef was first processed through a grinder having 0.125 inch diameter grinder plate openings. Five samples of the ground beef material were taken at the grinder output, the samples taken approximately 10 seconds apart. The ground beef was then cooled to approximately 28 degrees Fahrenheit (a temperature below the freezing point of the ground beef material) in about two minutes using a roller-type freezing machine described above. The frozen ground beef was cut into workpieces with a cutting machine associated with the roller-type freezer, the workpieces being about one-eighth inch thick and measuring approximately one-half inch by one-half inch. Five samples were taken at the output of the freezer/cutter arrangement.

The workpieces of ground beef at the process temperature were then placed in a block-type manipulating device similar to that shown in FIG. 7. The working area of the device was filled loosely with the workpieces and then the volume of the loose collection of workpieces was reduced by about 50% to form a block of frozen ground beef. The volume reduction was achieved by advancing a top plate. The block of material was then removed from the manipulating device and samples of material were cored at various locations around the block. These cores were mixed together and five samples of frozen material were then collected from the mix of cored material.

Tables 1 through 3 show the results of bacteria tests performed on the various samples described above. Tests were conducted for Total Plate count (TPC), E.Coli count, Coliform count, and Staph count. Tests were also conducted to detect the presence of Salmonella and Listeria. Table 1 shows the results for the five samples taken at the grinder output. Table 2 shows the results for the five samples taken at the freezer/cutter output. Table 3 shows the bacteria test results for the five samples taken from the material removed from the frozen block. Comparing Table 3 to Tables 1 and 2, the freezing and manipulation alone produced a reduction in Coliform and Staph counts in the ground beef.

TABLE 1

| Sample | TPC | E. Coli | Coliform | Staph | Sal. | List |
|---|---|---|---|---|---|---|
| 1 | 7,800 | 20 | 150 | 43 | Neg | Neg |
| 2 | 6,000 | 40 | 130 | 23 | Neg | Pos |
| 3 | 13,000 | 10 | 720 | 7 | Neg | Neg |
| 4 | 4,600 | 30 | 490 | 9 | Pos | Neg |
| 5 | 4,700 | 90 | 910 | 43 | Neg | Pos |
| Avg | 7,220 | 38 | 480 | 25 | N/A | N/A |

TABLE 2

| Sample | TPC | E. Coli | Coliform | Staph | Sal. | List |
|---|---|---|---|---|---|---|
| 1 | 20,000 | 10 | 250 | 23 | Pos | Neg |
| 2 | 9,200 | 40 | 490 | 4 | Neg | Pos |
| 3 | 16,000 | 10 | 720 | 9 | Neg | Neg |
| 4 | 5,100 | 10 | 130 | 7 | Neg | Neg |
| 5 | 6,900 | 20 | 680 | 23 | Neg | Neg |
| Avg | 11,440 | 18 | 454 | 13.2 | N/A | N/A |

TABLE 3

| Sample | TPC | E. Coli | Coliform | Staph | Sal. | List |
|---|---|---|---|---|---|---|
| 1 | 7,600 | 10 | 110 | 9 | Neg | Neg |
| 2 | 5,900 | 20 | 200 | 3 | Neg | Neg |
| 3 | 6,100 | 10 | 270 | 3 | Neg | Pos |
| 4 | 750 | 10 | 210 | 9 | Neg | Neg |
| 5 | 6,700 | 20 | 400 | 3 | Neg | Neg |
| Avg | 5,410 | 14 | 238 | 5.4 | N/A | N/A |

The second batch of beef material, comprising the ground beef mixed with 15% lean finely textured beef, was processed in the same fashion as the first batch and samples were taken in the same fashion and at the same points. Tables 4 through 6 show the results of bacteria tests performed on the samples from the second batch. Table 4 shows the results for the five samples taken at the grinder output. Table 5 shows the results for the five samples taken at the freezer/cutter output. Table 6 shows the bacteria test results for the five samples taken from the material removed from the frozen block. Comparing the Table 6 test results with those of Tables 4 and 5, there was a marked reduction in Total Plate count, E. Coli count, Coliform count, and Staph count in the samples taken after pH manipulation and manipulation in the block-type manipulation device. The "<" symbol in Table 6 indicates that the observed count was less than the minimum resolution for the test. Also, all tests for Salmonella and Listeria were negative in the material subjected to both pH manipulation and physical manipulation according to the invention.

TABLE 4

| Sample | TPC | E. Coli | Coliform | Staph | Sal. | List |
|---|---|---|---|---|---|---|
| 1 | 29,000 | 90 | 720 | 7 | Neg | Neg |
| 2 | 8,600 | 40 | 490 | 4 | Pos | Neg |
| 3 | 13,000 | 180 | 270 | 43 | Pos | Neg |
| 4 | 4,600 | 220 | 1,600 | 23 | Neg | Pos |
| 5 | 6,000 | 110 | 200 | 23 | Neg | Pos |
| Avg | 12,240 | 128 | 656 | 20 | N/A | N/A |

TABLE 5

| Sample | TPC | E. Coli | Coliform | Staph | Sal. | List |
|---|---|---|---|---|---|---|
| 1 | 5,800 | 10 | 110 | 9 | Neg | Neg |
| 2 | 3,400 | 40 | 200 | 4 | Neg | Pos |
| 3 | 3,900 | 10 | 270 | 7 | Neg | Neg |
| 4 | 3,100 | 10 | 210 | 4 | Neg | Neg |
| 5 | 5,300 | 20 | 400 | 9.1 | Neg | Neg |
| Avg | 4,300 | 18 | 238 | 6.6 | N/A | N/A |

TABLE 6

| Sample | TPC | E. Coli | Coliform | Staph | Sal. | List |
|---|---|---|---|---|---|---|
| 1 | 2,900 | <10 | 10 | <3 | Neg | Neg |
| 2 | 2,700 | <10 | <10 | <3 | Neg | Neg |
| 3 | 2,000 | <10 | 10 | <3 | Neg | Neg |
| 4 | 300 | <10 | <10 | <3 | Neg | Neg |
| 5 | 900 | <10 | 10 | <3 | Neg | Neg |
| Avg | 1,760 | <10 | | <3 | N/A | N/A |

Example II

Another test was performed using a block-type manipulation apparatus and a grinder-type manipulation apparatus. The test was performed on a foodstuff comprising lean finely textured beef (LFTB). The LFTB at approximately 50 degrees Fahrenheit was first exposed to ammonia gas to increase the pH of the material. The material was then thoroughly blended with a blending device. After blending, the pH increased LFTB was then frozen on a roller-type freezer to approximately 25 degrees Fahrenheit in less than approximately one minute, and cut into pieces measuring approximately one-half inch by one-half inch, and approximately one-quarter inch thick. These small workpieces of frozen LFTB were then compressed into a cylinder to form a cylindrically-shaped block of material measuring approximately two inches in diameter by approximately five inches in length. Upon removal of the material from the manipulating device, the temperature of each cylindrically-shaped block of LFTB was reduced slowly over the course of approximately three days to a temperature of approximate five to ten degrees Fahrenheit. The frozen material was then manipulated at approximately five to ten degrees Fahrenheit with a grinder having a grind size of approximately one-quarter inch. The resulting LFTB exiting the grinder was packed into boxes with 28 boxes to a pallet. As each box was being filled, a sample was taken from the box and these samples were mixed with samples from other boxes for the respective pallet to produce a composite mixture. A sample was taken for testing from the composite mixture produced for each pallet. These test samples are numbered 1 through 12 in Tables 7A and 7B. Each sample was tested for total plate count (TPC), and counts for *E. Coli,* Coliform, Psychrotrophic bacteria, and Staph as shown in Table 7A. Each sample was also tested for Salmonella, Listeria monocytogenes, pH, and ammonia content as shown in Table 7B. The "<" symbol in Table 7A indicates that the observed count was less than the minimum resolution for the test.

TABLE 7A

| SAMPLE | TPC | E. COLI | COLIFORM | PSY | STAPH |
|---|---|---|---|---|---|
| 1 | 1110 | <10 | <10 | 2600 | 3.6 |
| 2 | 1400 | <10 | 10 | 1600 | <3.0 |
| 3 | 1300 | <10 | <10 | 1900 | <3.0 |
| 4 | 5000 | <10 | <10 | 4300 | 39.0 |
| 5 | 3800 | <10 | <10 | 3200 | 9.1 |
| 6 | 3900 | <10 | <10 | 2200 | <3.0 |
| 7 | 2100 | <10 | <10 | 3200 | 9.1 |
| 8 | 3700 | <10 | <10 | 2300 | 3.0 |
| 9 | 1800 | <10 | <10 | 3400 | 9.1 |
| 10 | 3200 | <10 | 20 | 5300 | 9.1 |
| 11 | 2100 | <10 | 30 | 2700 | <3.0 |
| 12 | 2800 | <10 | <10 | 2900 | 9.1 |

TABLE 7B

| SAMPLE | SAL. | LIST. MONO. | pH | NH3 % |
|---|---|---|---|---|
| 1 | NEG | NEG | 6.55 | 0.031 |
| 2 | NEG | NEG | 6.94 | 0.054 |
| 3 | NEG | NEG | 7.02 | 0.077 |
| 4 | NEG | NEG | 7.26 | 0.088 |
| 5 | NEG | NEG | 7.08 | 0.089 |
| 6 | NEG | NEG | 7.07 | 0.076 |
| 7 | NEG | NEG | 7.13 | 0.084 |
| 8 | NEG | NEG | 7.19 | 0.077 |
| 9 | NEG | NEG | 7.62 | 0.100 |
| 10 | NEG | NEG | 7.40 | 0.100 |
| 11 | NEG | NEG | 7.27 | 0.079 |
| 12 | NEG | NEG | 7.20 | 0.068 |

Table 8 shows the results of tests performed on control samples. The control samples were treated as described above, but with no exposure to ammonia. A first control sample was taken from the process stream before the ammonia treatment began and a second control sample was taken after the ammonia treated material was cleared from the system. The results for the tests performed on these control samples are shown in Table 8.

TABLE 8

| CONTROL SAMPLE | TPC | E. COLI | COLIFORM | PSY | STAPH | SAL. | LIST. MONO |
|---|---|---|---|---|---|---|---|
| 1 | 6300 | 50 | 430 | N/S | 23.0 | NEG | POS |
| 2 | 8700 | 210 | 840 | N/S | N/S | N/S | N/S |

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A process for decreasing live microbe content in a foodstuff, the process comprising:
    (a) modifying the pH of an initial foodstuff to be processed to produce a pH modified foodstuff;
    (a) forming the pH modified foodstuff into a plurality of workpieces;
    (b) manipulating each workpiece in an initial manipulation while each respective workpiece is at a first temperature less than the freezing point of the pH modified foodstuff, the initial manipulation producing relative movement between points within each workpiece;
    (c) after the initial manipulation, modifying the temperature of each workpiece to a second temperature less than the freezing point of the pH modified foodstuff, the second temperature being a different temperature than the first temperature; and
    (d) manipulating each workpiece in an additional manipulation while each respective workpiece is at the second temperature, the additional manipulation producing relative movement between points within each workpiece.

2. The process of claim 1 further comprising the step of cooling the pH modified foodstuff to the first temperature.

3. The process of claim 2 wherein the step of cooling the pH modified foodstuff to the first temperature comprises bringing the pH modified foodstuff from an initial temperature over the freezing point of the pH modified foodstuff to no greater than approximately 28 degrees Fahrenheit in no more than thirty minutes.

4. The process of claim 2 further comprising the step of blending the pH modified foodstuff prior to cooling the pH modified foodstuff to the first temperature.

5. The process of claim 1 wherein:
    (a) each workpiece is maintained in a temperature range from approximately twenty degrees Fahrenheit to approximately twenty-eight degrees Fahrenheit while manipulating each workpiece in the initial manipulation; and
    (b) wherein the second temperature is no greater than approximately ten degrees Fahrenheit.

6. The process of claim 5 wherein the step of modifying the temperature of each workpiece to the second temperature is performed in no less than approximately twenty-four hours.

7. The process of claim 1 further comprising the step of:
    (a) controlling the temperature of surfaces which come in contact with each workpiece when each workpiece is manipulated in the initial and the additional manipulation.

8. The process of claim 1 wherein the step of modifying the pH of the initial foodstuff to be processed to produce the pH modified foodstuff comprises:
    (a) placing the initial foodstuff to be processed in contact with ammonia.

9. The process of claim 1 further comprising the steps of:
    (a) increasing the pressure on each workpiece as each workpiece is manipulated in the initial manipulation to cause at least a portion of the pH modified foodstuff to go to an un-frozen state as each workpiece is manipulated; and
    (b) placing back in a frozen state that portion of each workpiece which went to an un-frozen state as each workpiece was manipulated in the initial manipulation.

10. The process of claim 1 wherein:
(a) each workpiece is maintained in a temperature range from approximately twenty degrees Fahrenheit to approximately twenty-eight degrees Fahrenheit while manipulating each workpiece in the initial manipulation; and
(b) the second temperature is no greater than approximately ten degrees Fahrenheit.

11. The process of claim 10 wherein the step of modifying the temperature of each workpiece to the second temperature is performed in no less than approximately twenty-four hours.

12. The process of claim 10 further including the step of maintaining the temperature of each workpiece in a temperature range from approximately ten degrees Fahrenheit to approximately twenty-eight degrees Fahrenheit during a further manipulation.

13. A process for decreasing live microbe content in a comminuted meat product, the process comprising:
(a) modifying the pH of an initial meat product to produce the pH modified meat product;
(a) forming the pH modified meat product into a workpiece;
(b) manipulating the workpiece in an initial manipulation while the workpiece is at a first temperature less than the freezing point of the pH modified meat product, the initial manipulation producing relative movement between points substantially throughout the workpiece;
(c) modifying the temperature of the workpiece to a second temperature less than the freezing point of the pH modified meat product, the second temperature being a temperature different from the first temperature; and
(d) manipulating the workpiece in an additional manipulation while the workpiece is at the second temperature, the additional manipulation producing relative movement between points substantially throughout the workpiece.

14. The process of claim 13 wherein the step of modifying the pH of the initial meat product to produce the pH modified meat product comprises:
(a) placing the initial meat product in contact with ammonia.

15. The process of claim 13 further comprising the step of cooling the pH modified meat product to the first temperature.

16. The process of claim 15 wherein the step of cooling the pH modified meat product to the first temperature comprises bringing the pH modified meat product from an initial temperature over the freezing point of the pH modified meat product to no greater than approximately 28 degrees Fahrenheit in no more than thirty minutes.

17. The process of claim 15 further comprising the step of blending the pH modified meat product prior to cooling the pH modified meat product to the first temperature.

18. The process of claim 13 wherein:
(a) the workpiece is maintained in a temperature range from approximately twenty degrees Fahrenheit to approximately twenty-eight degrees Fahrenheit while manipulating the workpiece in the initial manipulation; and
(b) wherein the second temperature is no greater than approximately ten degrees Fahrenheit.

19. The process of claim 18 wherein the step of modifying the temperature of the workpiece to the second temperature is performed in no less than approximately twenty-four hours.

20. The process of claim 18 further including the step of maintaining the temperature of the workpiece in a temperature range from approximately ten degrees Fahrenheit to approximately twenty-eight degrees Fahrenheit during a further manipulation.

21. The process of claim 13 further comprising the step of:
(a) controlling the temperature of surfaces which come in contact with the workpiece when the workpiece is manipulated in the initial and additional manipulation.

22. The process of claim 13 further comprising the steps of:
(a) increasing the pressure on the workpiece as the workpiece is manipulated in the initial manipulation to cause at least a portion of the pH modified meat product to go to an un-frozen state as the workpiece is manipulated; and
(b) placing back in a frozen state that portion of the workpiece which went to an un-frozen state as the workpiece was manipulated in the initial manipulation.

23. A process for decreasing live microbe content in a foodstuff, the process comprising:
(a) forming the foodstuff into a plurality of workpieces;
(b) manipulating each workpiece in an initial manipulation while each respective workpiece is at a first temperature less than the freezing point of the foodstuff, the initial manipulation producing relative movement between points within each workpiece;
(c) increasing the pressure on each workpiece as each workpiece is manipulated in the initial manipulation to cause at least a portion of the foodstuff to go to an un-frozen state as each workpiece is manipulated;
(d) placing back in a frozen state that portion of each workpiece which went to an un-frozen state as each workpiece was manipulated in the initial manipulation;
(e) after the initial manipulation, modifying the temperature of each workpiece to a second temperature less than the freezing point of the foodstuff, the second temperature being a different temperature than the first temperature; and
(f) manipulating each workpiece in an additional manipulation while each respective workpiece is at the second temperature, the additional manipulation producing relative movement between points within each workpiece.

* * * * *